United States Patent
Elwell

(10) Patent No.: US 9,755,741 B1
(45) Date of Patent: Sep. 5, 2017

(54) VISIBLE-LIGHT BASED COMMUNICATION AND OCCUPANCY DETECTION

(71) Applicant: Brian Eugene Elwell, Tyrone, GA (US)

(72) Inventor: Brian Eugene Elwell, Tyrone, GA (US)

(73) Assignee: Cooper Technologies Company, Houston, TX (US)

( * ) Notice: Subject to any disclaimer, the term of this patent is extended or adjusted under 35 U.S.C. 154(b) by 128 days.

(21) Appl. No.: 14/607,754

(22) Filed: Jan. 28, 2015

Related U.S. Application Data

(60) Provisional application No. 61/932,375, filed on Jan. 28, 2014.

(51) Int. Cl.
*H04B 10/116* (2013.01)

(52) U.S. Cl.
CPC .................... *H04B 10/116* (2013.01)

(58) Field of Classification Search
CPC ...................... H04B 10/114–10/116
See application file for complete search history.

(56) References Cited

U.S. PATENT DOCUMENTS

| | | | | |
|---|---|---|---|---|
| 2008/0074307 A1* | 3/2008 | Boric-Lubecke | .... | A61B 5/0205 342/28 |
| 2012/0126700 A1* | 5/2012 | Mayfield | ............ | H05B 37/0272 315/86 |
| 2014/0093254 A1* | 4/2014 | Gotou | .................. | H04B 10/116 398/203 |
| 2015/0132006 A1* | 5/2015 | Inoue | ................. | H05B 37/0263 398/118 |

FOREIGN PATENT DOCUMENTS

JP  2015-118909  *  6/2015  ........... H04B 10/116

* cited by examiner

*Primary Examiner* — Nathan Curs
(74) *Attorney, Agent, or Firm* — King & Spalding LLP

(57) ABSTRACT

A lighting device for illumination, data communication, and occupancy detection includes a processor and a transmitter circuit that is configured to generate a first electrical signal. During a first time duration, the first electrical signal is a carrier signal having a first frequency, and during a second time duration, the first electrical signal is a data encoded signal. The lighting device further includes a light source configured to emit a first visible light based on the first electrical signal. The lighting device also includes a receiver configured to receive a second visible light. The processor is configured to detect a motion in a monitored area based on the second visible light.

9 Claims, 9 Drawing Sheets

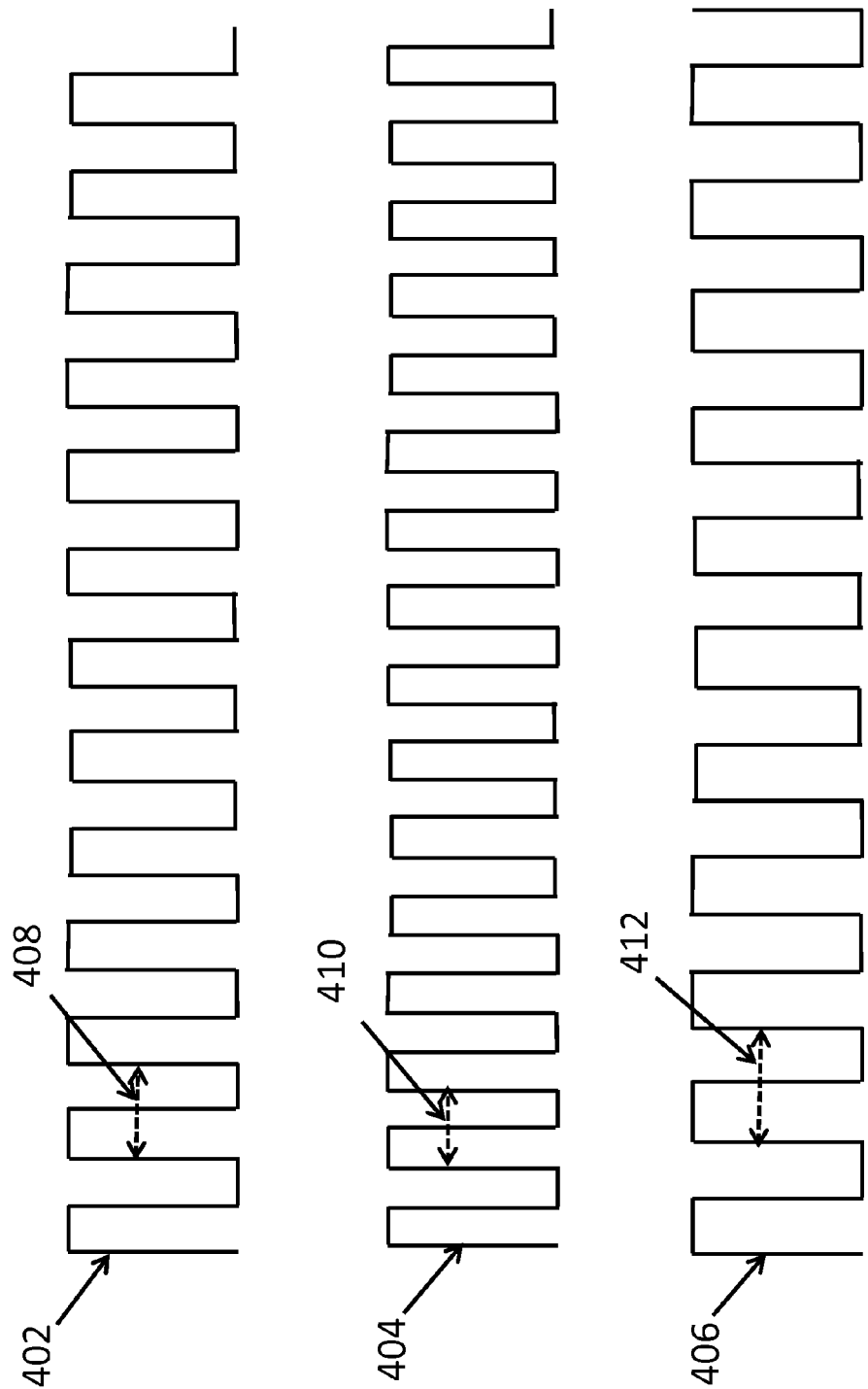

VISIBLE-LIGHT BASED COMMUNICATION AND OCCUPANCY DETECTION

RELATED APPLICATIONS

The present application claims priority under 35 U.S.C. §119(e) to U.S. Provisional Patent Application No. 61/932,375, filed Jan. 28, 2014, and titled "Visible Light Based Communication and Occupancy Detection," the entire content of which is incorporated herein by reference.

TECHNICAL FIELD

The present disclosure relates generally to visible-light based communication and occupancy detection, and in particular to use of visible light from a light source for both data communication and occupancy detection.

BACKGROUND

Visible light that is ordinarily used to illuminate an area can be used for data communication purposes. For example, visible light from a lighting fixture can be used to simultaneously illuminate an area as well as communicate with other devices such as other lighting fixtures. To illustrate, one or more light sources (e.g., light emitting diodes (LEDs)) of a lighting fixture can be turned on and off at a relatively high frequency/rate such that the switching of the emitted light is undetectable by people while the on-off switching can be detected by a receiving device. Similarly, the intensity level of the emitted light can be changed at a high enough frequency/rate such that the resulting cycling of the light is not detectable by people. However, cycling of the emitted light that is undetectable by people can be used to represent data intended for a receiving device that is capable of detecting the cycling.

In some applications, a lighting fixture may be turned on or off based on the detection of motion. For example, an occupancy detector (e.g., infrared motion detector) associated with a lighting fixture may be used to detect motion in a monitored area. The lighting fixture can be turned on or off based on an output signal from the occupancy detector that indicates whether a motion is detected. In some applications, an active device that transmits an output signal may be used for occupancy detection. For example, the device may rely on detecting Doppler shifts to detect motion in the monitored area. U.S. Pat. No. 8,232,909, issued to the assignee of this patent application and incorporated herein by reference, describes a device that relies on Doppler shift to detect motion.

In some applications, a device (e.g., a lighting fixture) that uses visible light to illuminate an area, communicate with other devices and detect motion may eliminate the need for a separate occupancy detector.

SUMMARY

The present disclosure relates generally to visible-light based communication and occupancy detection. In an example embodiment, a lighting device for illumination, data communication, and occupancy detection includes a processor and a transmitter circuit that is configured to generate a first electrical signal. During a first time duration, the first electrical signal is a carrier signal having a first frequency, and during a second time duration, the first electrical signal is a data encoded signal. The lighting device further includes a light source configured to emit a first visible-light based on the first electrical signal. The lighting device also includes a receiver configured to receive a second visible light. The processor is configured to detect a motion in a monitored area based on the second visible light.

In another example embodiment, a lighting device for illumination, data communication, and occupancy detection includes a processor and a transmitter circuit that is configured to generate a first electrical signal. The lighting device further includes a light source configured to emit a first visible-light based on the first electrical signal. The lighting device also includes a receiver configured to receive a second visible light and to convert the second visible light into a second electrical signal. The processor is configured to detect a motion in a monitored area based on the second electrical signal.

In another example embodiment, a system of lighting devices includes a first lighting device and a second lighting device. The first lighting device is configured to emit a first visible light, and the second lighting device is configured to emit a second visible light. The first lighting device and the second lighting device are configured to communicate with each other via the first visible light and the second visible light. The first lighting device is configured to detect a motion in a monitored area based on a reflected light.

These and other aspects, objects, features, and embodiments will be apparent from the following description and the appended claims.

BRIEF DESCRIPTION OF THE DRAWINGS

Reference will now be made to the accompanying drawings, which are not necessarily drawn to scale, and wherein:

FIG. 4 illustrates waveforms of electrical signals corresponding to emitted visible light and received visible light according to an example embodiment;

Figure 1:
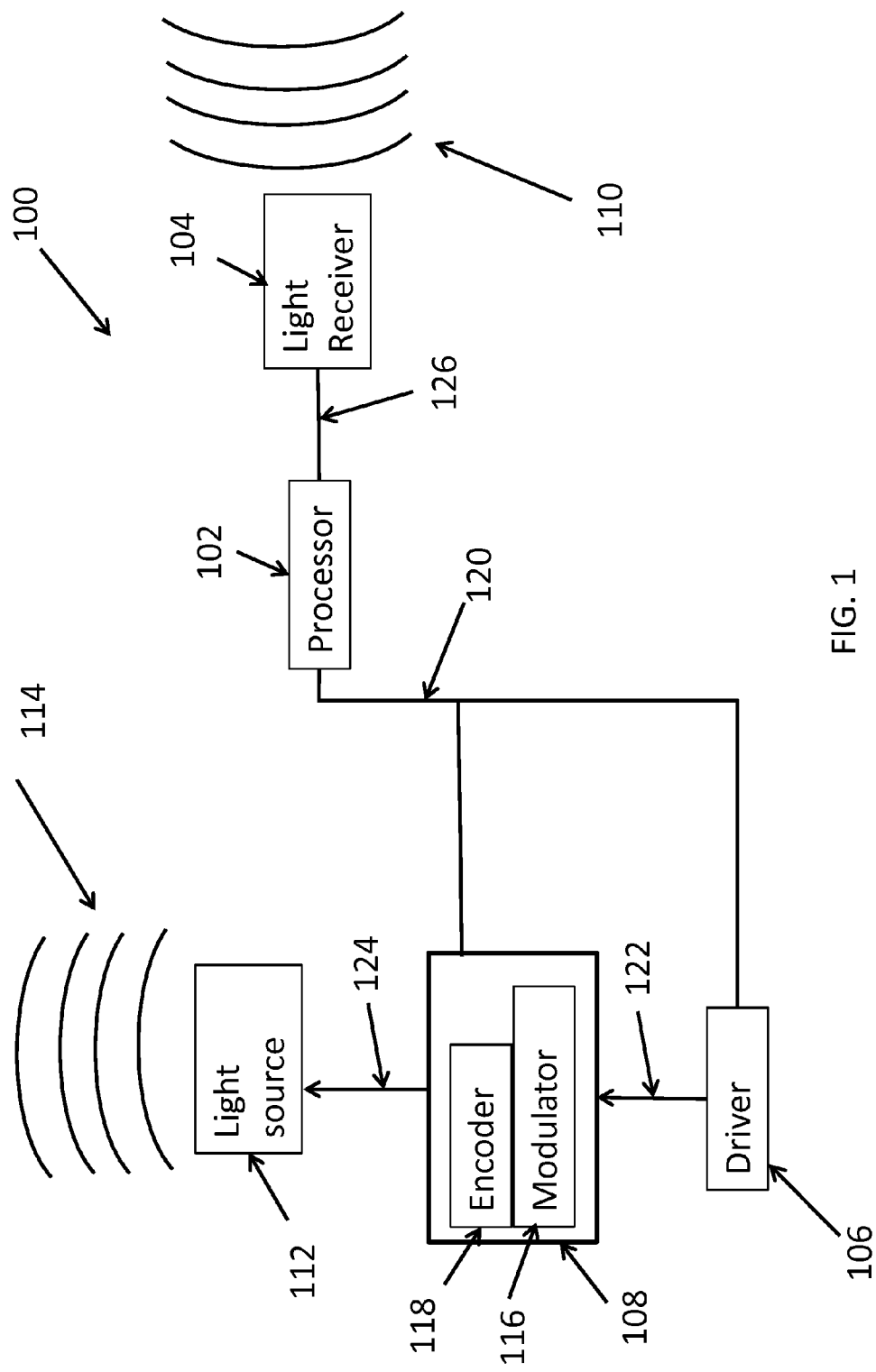
FIG. 1 illustrates a lighting device that is used for illumination, visible-light based communication, and occupancy detection according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments.

Additionally, certain dimensions or placements may be exaggerated to help visually convey such principles. In the drawings, reference numerals designate like or corresponding, but not necessarily identical, elements.

DETAILED DESCRIPTION OF THE EXAMPLE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

Turning now to the drawings, FIG. 1 illustrates a lighting device 100 that is used for illumination, visible-light based communication, and occupancy detection according to an example embodiment. The lighting device 100 includes a processor 102, a light receiver 104, a driver 106, a transmitter circuit 108, and a light source 112. The processor 102 is coupled to the light receiver 104 via a connection 126. The processor 102 is also coupled to the driver 106 and the transmitter circuit 108 via a connection 120. The driver 106 is coupled to the transmitter circuit 108 via a connection 122. The transmitter circuit 108 is coupled to the light source 112 via a connection 124.

In some example embodiments, the processor 102 may have an interface to or include one or more memory devices, such as a static random access memory (SRAM), that are used to store data and code for execution by the processor 102. The processor 102 is configured to process one or more electrical signals received from the light receiver 104 via the connection 126. The processor 102 may also be configured to control the driver 106 and the transmitter circuit 108 via the connection 120. For example, the processor 102 may control whether the light source 112 is turned on or off by controlling the driver 106 via the connection 120. The processor 102 may also control the intensity level of a visible light 114 emitted by the lighting source 112 by controlling the driver 106. Alternatively, the processor 102 may control whether the light source 112 is turned on or off and/or the intensity level of the visible light 114 by controlling the transmitter circuit 108. The processor 102 may also control the durations of time that the lighting source 112 is on and off. Further, the processor 102 may control the durations of time that the lighting source 112 emits the visible light 114 at particular intensity levels. The light source 112 may be one or more discrete LEDs, one or more organic light-emitting diodes (OLEDs), an LED chip on board that includes one or more discrete LEDs, an array of discrete LEDs, or light source(s) other than LEDs. The driver 106 may be an LED or similar driver designed to provide power to the light source 112.

In some example embodiments, the transmitter circuit 108 includes a modulator 116 and an encoder 118. The transmitter circuit 108 may receive an electrical signal, i.e., a driver signal, from the driver 106 via the connection 122 and generate an output electrical signal on the connection 124 based on the driver signal. To illustrate, the modulator 116 of the transmitter circuit 108 may modulate the driver signal received via the connection 122 such that the output signal generated by the transmitter circuit 108 on the connection 124 is a carrier signal having a carrier frequency. For example, the carrier signal may be a square wave having a particular carrier frequency. To illustrate, the output signal may be a carrier signal having a frequency of, for example, 100 KHz.

In some example embodiments, instead of generating a carrier signal as the output signal on the connection 122, the transmitter circuit 108 may modulate and encode the driver signal received from the driver 106 to generate the output signal on the connection 124 such that the output signal is a data encoded signal. For example, the data that is encoded in the output signal may be intended for other lighting devices or other devices that can communicate using visible light. To generate the output signal as the data encoded signal, the modulator 116 of the transmitter circuit 108 may generate a carrier signal by modulating the driver signal received from the driver 106, and the encoder 118 of the transmitter circuit 108 may encode the carrier signal to generate the output signal as the data encoded signal. In some example embodiments, the data encoded signal may include a start bit, a particular sequence of bits, or another marker for use by a receiving device (e.g., a lighting device) to identify the signal as a data encoded signal. For example, the encoder 118 may add the start bit, the particular sequence of bits, or another marker in the data encoded signal.

In general, the transmitter circuit 108 may generate the output signal as the data encoded signal during some time durations and as a carrier signal having a carrier frequency (i.e., not encoded with data) during some other time durations. For example, the transmitter circuit 108 may generate the output signal such that the output signal is a carrier signal (i.e., a signal that is modulated but not encoded with data) for a first time duration and such that the output signal is a data encoded signal (i.e., a signal modulated and encoded) for a second time duration. To illustrate, as a non-limiting example, the output signal from the transmitter circuit 108 may be a carrier signal for a first time period, a data encoded signal for an adjacent second time period, a carrier signal for a third time period adjacent to the second time period, a data encoded signal for a fourth time period adjacent to the third time period.

During some time durations, the output signal from the transmitter circuit 108 may be a static signal (e.g., when the light source 112 is to be turned off or is turned off). A time period during which the output signal is a static signal may be interspersed between time periods that the output signal is a carrier signal and a data encoded signal.

Figure 3A:
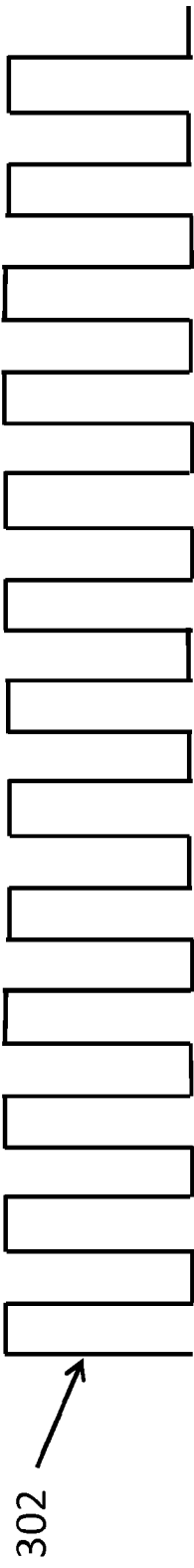
FIGS. 3A and 3B illustrate waveforms of electrical signals that correspond to the light emitted or received by a lighting device of FIGS. 1 and 2 for illumination, visible-light based communication, and occupancy detection.
Figure 3B:
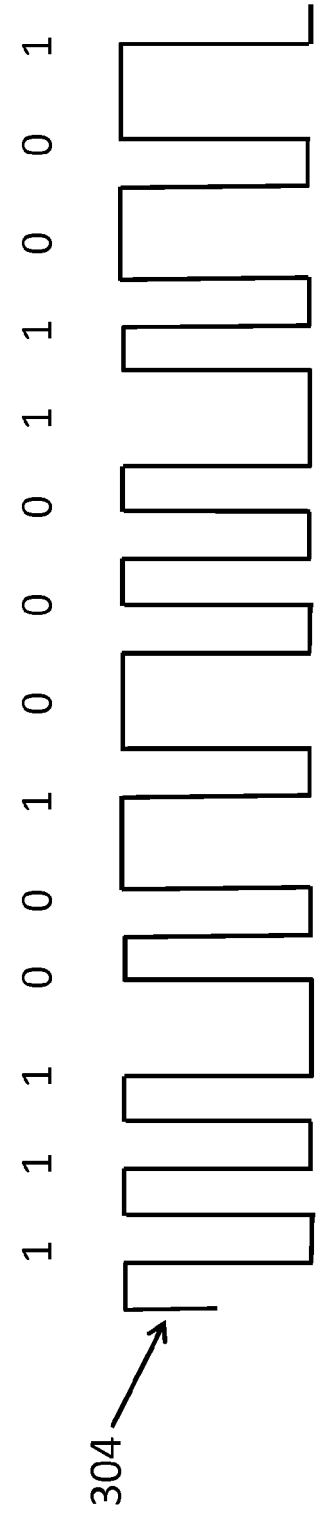

In some example embodiments, Manchester coding may be used to generate the output signal on the connection 124. Use of Manchester coding allows for the total energy generated by the light source 112 to be substantially the same when emitting the visible light 114 based on the carrier signal as well as based on the data encoded signal. An example waveform of a carrier signal is shown in FIG. 3A, and an example waveform of a data encoded signal is shown in FIG. 3B. The output signal generated by the transmitter circuit 108 on the connection 124 may be a sequence of carrier signals (e.g., the signal corresponding to the waveform 302 shown in FIG. 3A) and data encoded signals (e.g., the signal corresponding to the waveform 304 shown in FIG. 3B). The transmitter circuit 108 may generate the output signal on the connection 124 based on one or more control signals provided by the processor 102 via the connection 120.

The visible light 114 is emitted by the light source 112 based on the output signal generated by the transmitter circuit 108 and provided to the light source 112 via the connection 124. To illustrate, when the output signal on the connection 124 is a carrier signal having a carrier frequency (e.g., 100 KHz), the light source 112 may switch on and off at a rate corresponding to the carrier frequency. Alternatively, instead of switching on and off, the intensity level of the visible light 114 emitted by the light source 112 may change at a rate corresponding to the carrier frequency. When the output signal on the connection 124 is a data encoded signal, the light source 112 may be switched on and off based on the type of data encoding as well as the data sequence. For example, when Manchester coding is used to generate the output signal, the light source 112 may be switched on and off more frequently than when other encoding schemes that produce fewer data transitions are used.

In some example embodiments, the carrier frequency may be a frequency (e.g., a reference frequency) of a carrier signal that other lighting fixtures use to generate visible light (e.g., visible light 110) during some time durations. The carrier frequency may also be a frequency (e.g., a reference frequency) of a carrier signal that other lighting fixtures and devices recognize as a frequency used by the lighting device 100 in emitting the visible light 114 (during some durations).

In some example embodiments, the light receiver 104 is configured to receive a visible light 110 and to convert the visible light 110 to an electrical signal that is provided to the processor 112 via the connection 126. For example, the light receiver 104 may include one or more photodetector components (e.g., PIN or other photodetector diode). The processor 102 may process the electrical signal to determine whether the electrical signal is a data encoded signal or an unencoded signal (e.g., a carrier signal). At least a portion of the visible light 110 received by the light receiver 104 may be light emitted by another lighting device similar to the lighting device 100.

In some example embodiments, at least a portion of the visible light 110 may be a reflected light. For example, the visible light 114 may be reflected off, for example, a stationary object or a moving object (e.g., a person) resulting in at least a portion of the visible light 110. As another example, at least a portion of the visible light 110 may be a visible light from another lighting device that is reflected off a stationary object or a moving object. For example, another lighting device may emit a visible-light based on an electrical signal that has substantially the same frequency as the output signal on the connection 124 during time durations the output signal is a carrier signal.

In some example embodiments, the electrical signal on the connection 126 may be an unencoded signal (e.g., a carrier signal) during some time duration(s) and a data encoded signal during other time duration(s). In response to determining that the electrical signal on the connection 126 from the light receiver 104 is a data encoded signal, the processor 102 may decode the electrical signal. For example, the processor 102 may monitor the electrical signal on the connection 126 for a start bit, a particular sequence of bits, or another trigger to check whether the electrical signal is a data encoded signal. Further, the processor 102 may turn off the light source 112 to reduce the probability of interference by the visible light 114 on the reception of the visible light 110. For example, the processor 102 may turn on or off the light source 112 of the lighting device 100 based on the data extracted/decoded from the electrical signal on the connection 126. As another example, the processor 102 may change the intensity level of the visible light 114 based on the extracted/decoded data.

In response to determining that the electrical signal on the connection 126 from the light receiver 104 is an unencoded signal, the processor 102 may check for motion in a monitored area. To illustrate, the processor 102 may compare a frequency of the electrical signal on the connection 126 against the carrier frequency of the carrier signal generated by the modulator 116 and provided to the light source 112 as the output signal. Alternatively, the processor 102 may check for motion in the monitored area by comparing a frequency of the electrical signal on the connection 126 against a reference frequency. The reference frequency may correspond to a frequency that multiple lighting devices including the lighting device 100 use to generate carrier signals such as the carrier signal generated by the modulator 118 as described above. In some example embodiments, when the carrier/reference frequency is 100 KHz, a frequency of the electrical signal on the connection 126 that is +/−100 hertz from the carrier frequency may indicate motion within a range of human activity.

In some example embodiments, if the processor 102 detects a motion in the monitored area, the lighting device 100 may increase the intensity level of the visible light 114 to increase illumination of the monitored area. To illustrate, the processor 102 may control the driver 106 to increase the current (e.g., average current) provided to the lighting device 112. In some example embodiments, if a motion is not detected in a monitored area for a period of time, the lighting device 100 may start emitting the visible light 114 at a lower intensity level.

In some example embodiments, if the processor 102 detects a motion in the monitored area based on a frequency difference between the carrier/reference frequency and the frequency of the electrical signal on the connection 126, the processor 102 may determine whether the detected motion is in a direction that is toward or away from the lighting device 100. If the processor 102 determines that the motion is toward the lighting device, the lighting device 100 may increase the intensity level of the visible light 114 to increase illumination of the monitored area. In some example embodiments, to determine the direction of the motion, the processor 102 may compare the frequency of the electrical signal from the light receiver 104 against a first threshold frequency and a second threshold frequency. To illustrate, the first threshold frequency is lower than the carrier (or reference) frequency, and the second threshold frequency is higher than the carrier (or reference) frequency.

By comparing the frequency of the electrical signal on the connection 126 from the light receiver 104 against the first and second threshold frequencies (for example, relative to the carrier/reference frequency), the processor 102 can determine whether the detected motion is directed toward or away from the lighting device 100. To illustrate, a frequency of the frequency of the electrical signal on the connection 126 that is below the carrier/reference frequency and above the first threshold frequency may indicate a human motion a direction that is away from the light source but may be toward or away from another light source. A frequency of the electrical signal on the connection 126 that is above the carrier/reference frequency and below the second threshold frequency may indicate a motion by a person toward the light source but may be toward or away from another light source.

In some example embodiments, the processor 102 may communicate with the transmitter circuit 108 to generate a data encoded signal as the output signal (for example, for a particular duration) that indicates the detection of motion and/or the relative direction of the motion. The data encoded signal is provided to the light source 112 as the output signal on the connection 124, which results in the light source 112 emitting the visible light 114 corresponding to the data encoded signal. Thus, a device that is capable of receiving and processing the visible light 114 or a reflection of the visible light 114 may be able to determine that a motion and/or direction of motion detected/determined by the lighting device 100.

The lighting device 100 can communicate with other devices using the visible light 114 emitted by the light source 112. Using the visible light 114, the lighting device 100 can also perform occupancy detection by detecting motion and determine relative direction of the motion in an area illuminated by the visible light 114 and/or visible light emitted by other similar devices.

Although motion detection by the lighting device 100 is described with respect to the carrier frequency corresponding to the carrier signal portion of the output signal on the connection 124, in some alternative example embodiments, the data encoded signal may also be used to detect motion. Although a single connection may be shown between some elements of the lighting device 100, those skilled in the art would recognize that the different elements of the lighting device 100 may be connected via one or more connections and may communication using one or more signals. Although the connection 120 is shown going between the processor 102, the driver 106, and the transmitter circuit 108, the connection 120 may include multiple connections with some of the multiple connections extending between two of these elements. The processor 102 may perform the operations described above using hardware components (e.g., one or more comparators) and/or software.

Figure 2:
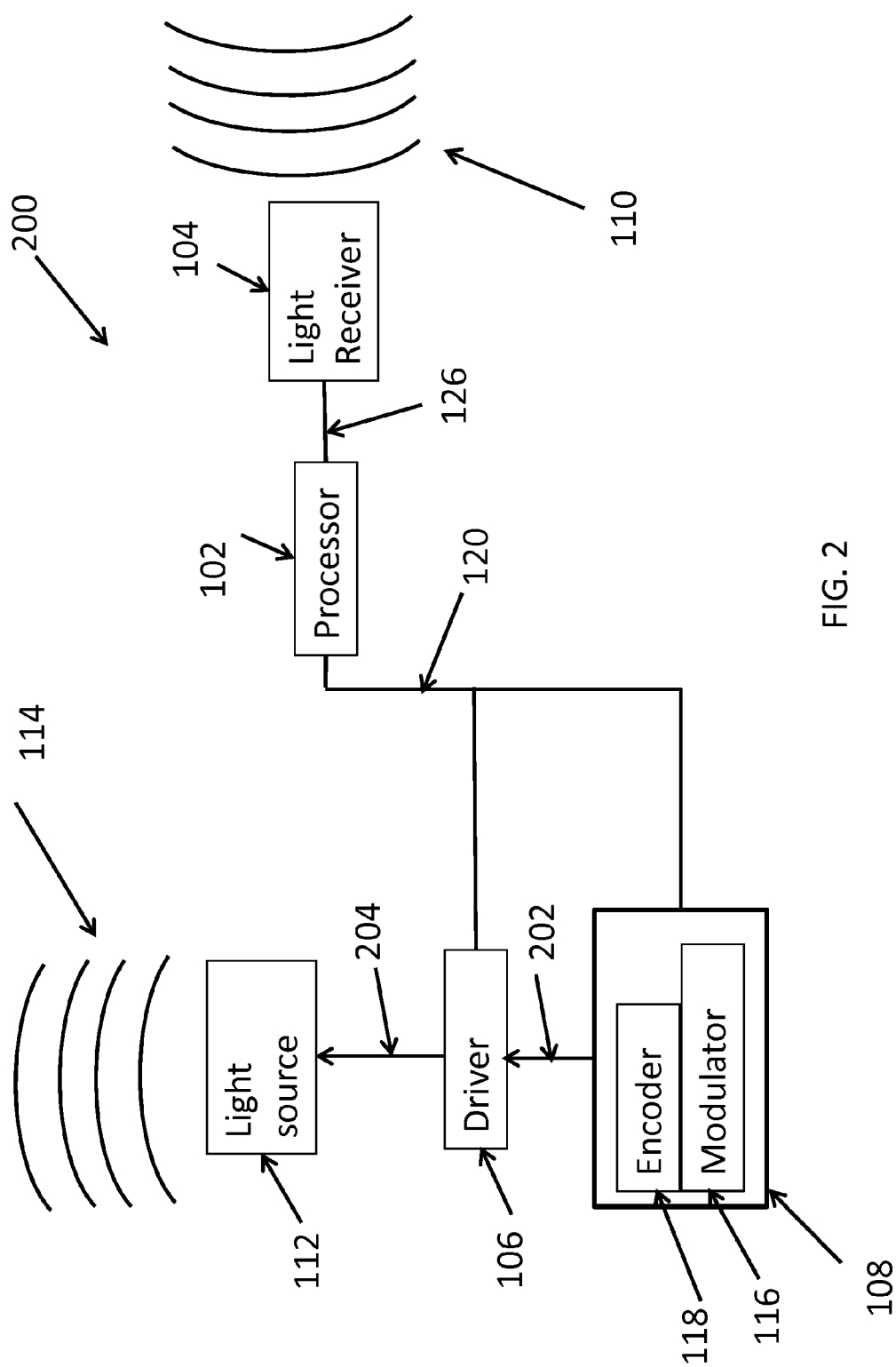
FIG. 2 illustrates a lighting device that is used for illumination, visible-light based communication, and occupancy detection according to another example embodiment.

FIG. 2 illustrates a lighting device 200 that is used for illumination, visible-light based communication, and occupancy detection according to another example embodiment. The lighting device 200 operates substantially in the same manner as described above with respect to the lighting device 100. Focusing on the main difference between the example embodiments of FIG. 1 and FIG. 2, in the lighting device 200 of FIG. 2, the driver 106 receives a driver input signal from the transmitter circuit 108 via a connection 202. The driver input signal from the transmitter circuit 108 may be a carrier signal and/or a data encoded signal that is generated by the transmitter circuit 108 based on one or more signals provided to the transmitter circuit 108 from the processor 102 via the connection 120. The modulator 116 may generate a carrier signal that is provided as the driver input signal on the connection 202 or the encoder 118 may first encode the carrier signal with data to generate an encoded signal that is provided as the driver input signal on the connection 202.

In some example embodiments, the driver input signal on the connection 202 may be a sequence of carrier signals (e.g., the signal corresponding to the waveform 302 shown in FIG. 3A) and data encoded signals (e.g., the signal corresponding to the waveform 304 shown in FIG. 3B). A driver signal generated by the driver 106 on a connection 204 is provided to the light source 112 to generate the visible light 114. In some example embodiments, the driver signal on the connection 204 is generated based on and substantially resembles the driver input signal provided on the connection 202. The processor 102 may control intensity level of the visible light 114 by communicating with the driver 106 such that the driver 106 generates the appropriate driver signal levels (e.g., current levels).

FIGS. 3A and 3B illustrate waveforms of electrical signals that correspond to an electrical signal that is used to generate the visible light 114 emitted by the lighting device 100, 200 and the visible light 110 received by the lighting device 100, 200. In some example embodiments, the waveform in FIG. 3A corresponds to a carrier signal (i.e., an electrical signal that has a particular frequency at least for a duration of time). The waveform in FIG. 3B corresponds to an encoded signal (i.e., an electrical signal that has been encoded with data at least for a duration of time). The example data encoded in the encoded signal corresponding to the waveform of FIG. 3B are shown above the waveform.

FIG. 4 illustrates waveforms of electrical signals corresponding to an emitted visible light and the received visible light 110 shown in FIGS. 1 and 2 according to an example embodiment. For example, the emitted visible light may be the visible light 114 shown in FIGS. 1 and 2 or visible light emitted by another lighting device. To illustrate, the waveform 402 may correspond to a carrier signal such as the output signal that may be generated by the transmitter circuit 108, for example, for a duration of time. The waveform 404 corresponds to an electrical signal converted from the visible light 110, where the frequency of the converted electrical signal is higher than the frequency of the carrier signal shown in waveform 402. When the visible light 110 is received by the light devices 100, 200, the higher frequency may indicate motion toward the lighting device 100, 200. The waveform 406 corresponds to an electrical signal converted from the visible light 110, where the frequency of the converted electrical signal is lower than the frequency of the carrier signal shown in waveform 402. When the visible light 110 is received by the light devices 100, 200, the lower frequency may indicate motion away from the lighting device 100, 200.

Based on the frequencies of the electrical signals converted from the received visible light 110, the processor 102 of the lighting device 100, 200 may determine whether the motion is consistent with motions expected of an entity such as a human. For example, the processor 102 may not take any subsequent action if the frequency of the converted electrical signal corresponds to a motion that is not within the range of 1 ft. to 3 ft. per second generally corresponding to an example range of human motion. The particular frequency of the converted electrical signal that corresponds to a range of motion of interest may depend on the carrier frequency of the carrier signal that may be generated by the transmitter circuit 108, for example, for a duration of time.

Figure 5:
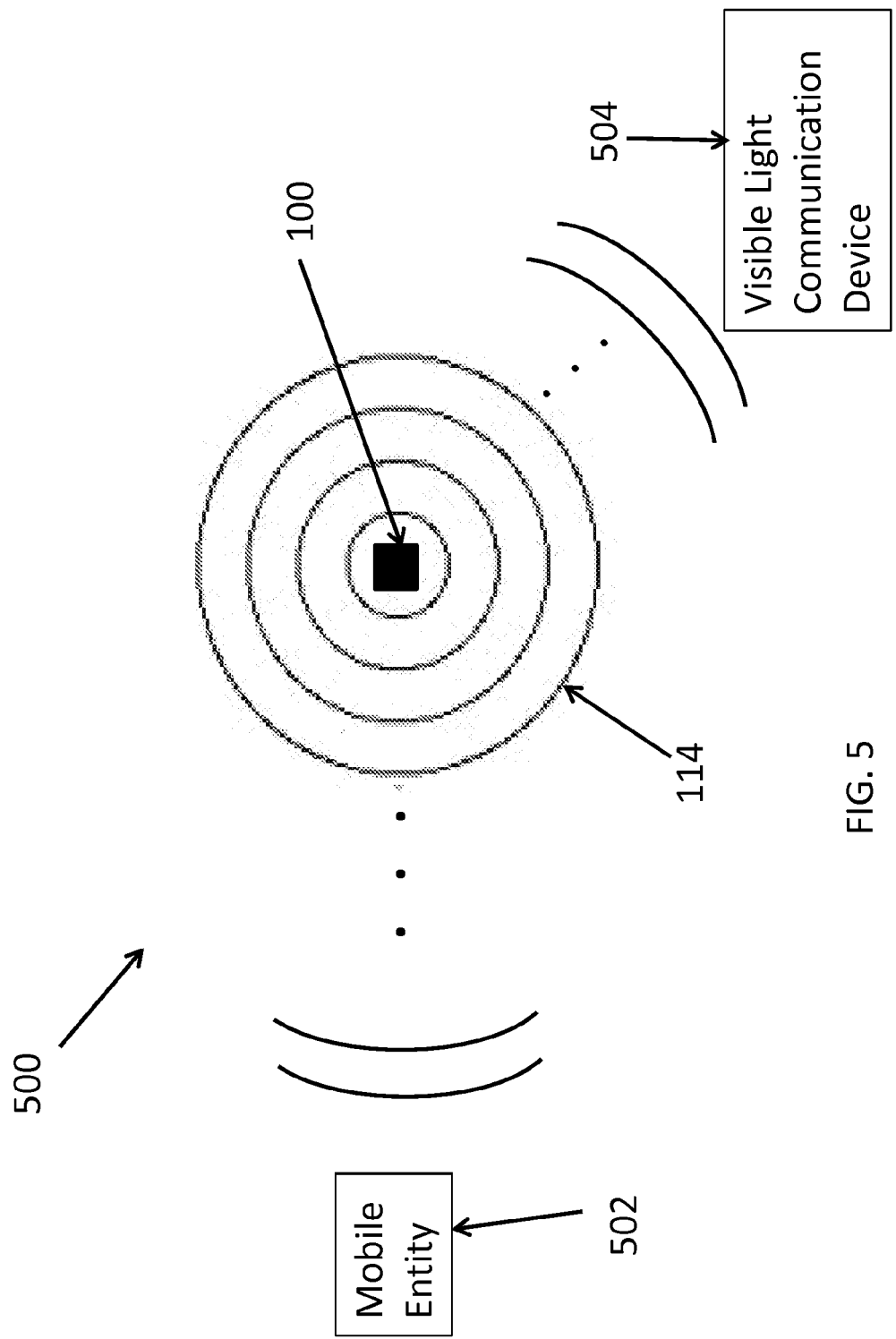
FIG. 5 illustrates a system including the lighting device of FIG. 1 for illumination, visible-light based communication, and occupancy detection according to an example embodiment.

FIG. 5 illustrates a system 500 including the lighting device 100 of FIG. 1 for visible-light based communication and occupancy detection according to an example embodiment. The system 500 includes the lighting device 100 and a visible-light communication device 504. The lighting device 100 may use the visible light 114 to communicate with the visible-light communication device 504 by encoding data in the electrical signal used to generate the visible light 114 in a manner described above. The lighting device 100 may also use the visible light 114 to detect motion of a mobile entity 502, such as a human, based on visible light reflected off the mobile entity 502 in a similar manner described above. For example, the lighting device 100 may detect motion of the mobile entity 502 and communicate the detection of the motion to the visible-light communication device 504 using the visible light 114 by encoding the message in the electrical signal provided to the light source of the lighting device 100 via the connection 124 shown in FIG. 1.

Although the lighting device 100 is shown in FIG. 5, the system 500 may alternatively or in addition include the lighting device 200 or another lighting device. Further, the visible-light communication device 504 may be the lighting device 100, the lighting device 200, another lighting device, or a device that can receive and process visible light.

Figure 6A:
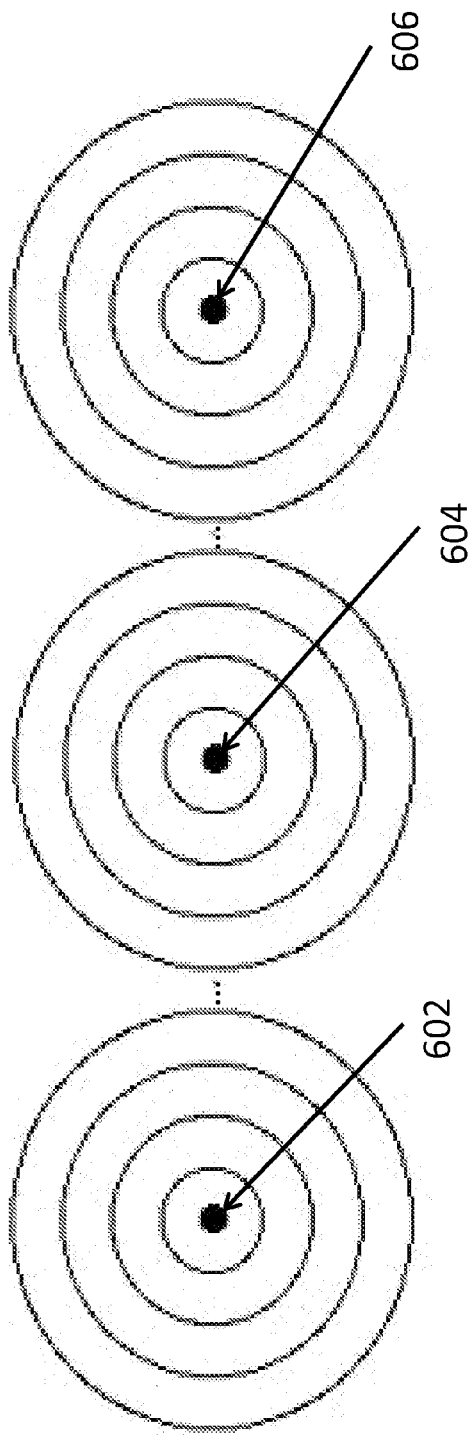
FIGS. 6A and 6B illustrate a system of lighting devices of FIGS. 1 and 2 for visible-light based communication and occupancy detection according to another example embodiment.
Figure 6B:
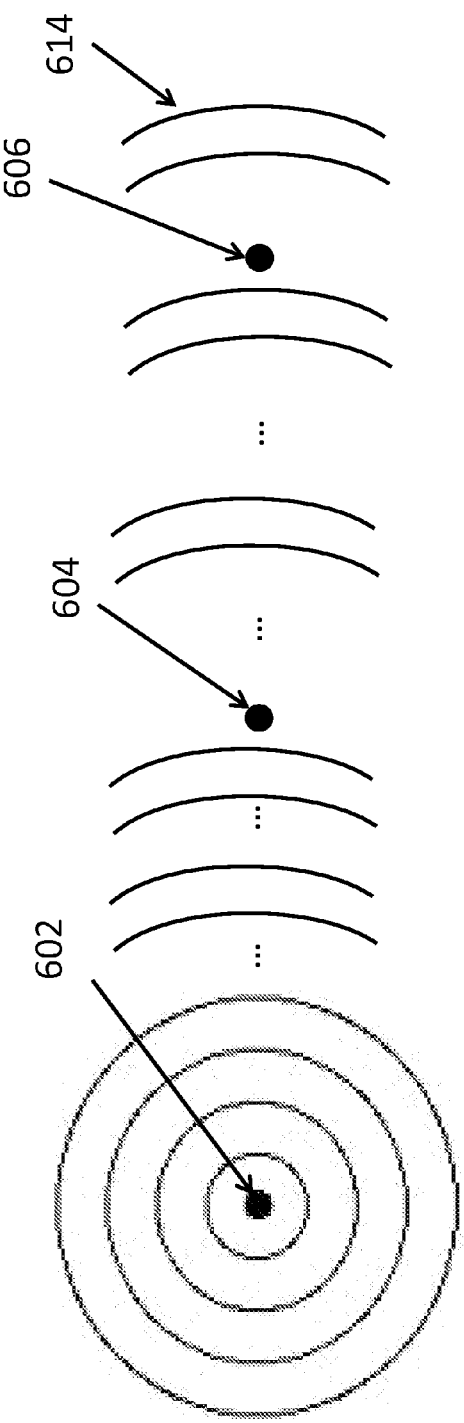

FIGS. 6A and 6B illustrate a system of lighting devices of FIGS. 1 and 2 for visible-light based communication and occupancy detection according to another example embodiment. Referring to FIG. 6A, lighting devices 602, 604, and 606 (which may correspond to the lighting devices 100, 200) emit visible lights. Each of the lighting devices 602, 604, 606 may detect motion of a mobile entity (e.g., the mobile entity 502) based on visible light reflected off the mobile entity in a manner described above. The reflected light received by any one of the lighting devices 602, 604, 606 may be a result of a reflection of the visible light emitted by any one or more of the lighting devices 602, 604, 606.

Further, each of the lighting devices 602, 604, 606 may communicate with the remaining lighting devices 602, 604, 606 by emitting visible light in a similar manner described above. In some example embodiments, the electrical signals of the lighting device 602, 604, 606 that are used to generate the corresponding visible lights emitted by the respective lighting device 602, 604, 606 may be phase aligned. Further, collisions due to attempts by more than one lighting device to communicate data (i.e., emit visible signal based on a data encoded electrical signal instead of a carrier signal) may be resolved using conflict resolution protocols known to those of ordinary skill in the art. For example, a lighting device that detects a collision can immediately stop emitting visible-light based on a data encoded electrical signal provided by the respective driver 106 or the respective transmitter circuit 108 shown in FIGS. 1 and 2.

Referring to FIG. 6B, the lighting device 602 is emitting visible light while the lighting devices 604, 606 are not emitting light. Further, the lighting device 602 may be emitting visible light 614 at a relatively low (dimmed) intensity level, for example, because no motion has been detected in a monitored area (e.g., an area within an illumination zone of the lighting devices 602, 604, 606) for a particular period of time. While emitting the visible light 614, the lighting device 602 may detect motion in the monitored area. Upon detecting the motion using the visible light 614 in a manner described above, the lighting device 602 may communicate to the other lighting devices 604, 606 via the visible light 614 that motion has been detected. The lighting device 602 may communicate the detection of motion by encoding data indicating motion detection as described above.

Alternatively or in addition, the lighting device 602 may communicate, using the visible light 614, the direction of motion or simply instruct the other lighting devices 604, 606 to turn on. For example, one or both of the other lighting devices 604, 606 may start emitting light based on the communication from the lighting device 602. To illustrate, if the lighting device 602 indicates to the other lighting devices 604, 606 that a motion toward the lighting device 602 is detected, the other lighting devices 604, 606 may start emitting respective visible lights. The lighting device 602 may also increase the intensity level of the visible light 614 in response to detecting the motion and determining the direction of the motion. The lighting device 602 may increase the intensity level of the visible light 614 before or after communicating with the other lighting devices 604, 606.

Figure 7:
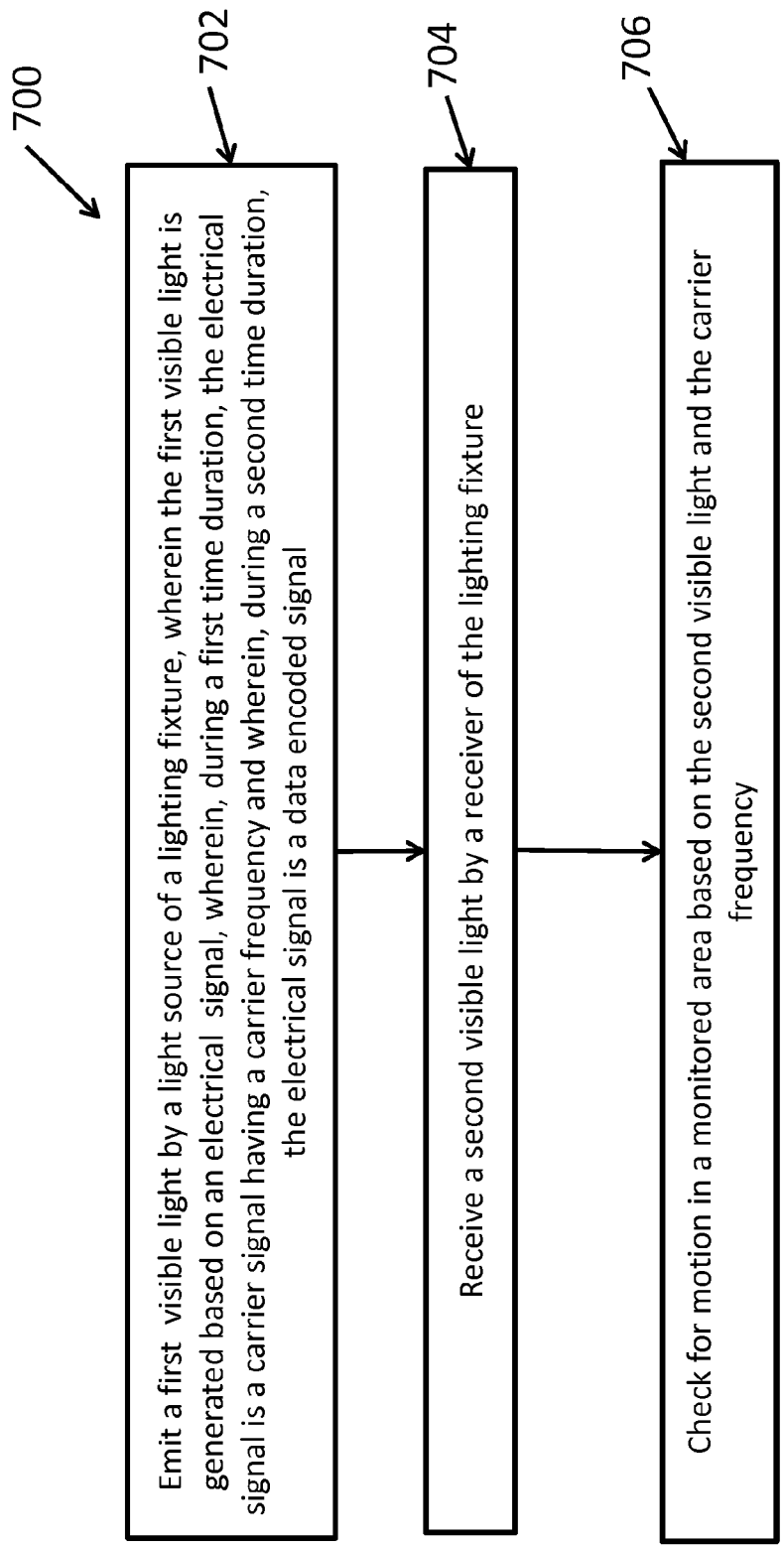
FIG. 7 is a flowchart illustrating a method of visible-light based communication and occupancy detection according to an example embodiment.

FIG. 7 is a flowchart illustrating a method 700 of visible-light based communication and occupancy detection according to an example embodiment. At step 702, the method 700 includes emitting a first visible light by a light source of a lighting device/fixture such as the lighting device 100, 200 of FIGS. 1 and 2, respectively. For example, the first visible light may be the visible light 114 shown in FIGS. 1 and 2. The first visible light is generated/emitted based on an electrical signal. For example, the electrical signal may be the output signal generated by the transmitter circuit 108 of FIG. 1 on the connection 124. As another example, the electrical signal may be the driver signal generated by the driver 106 of FIG. 2 on the connection 204. During a first duration, the electrical signal may be a carrier signal having a carrier frequency. During a second time duration, the electrical signal may be a data encoded signal. In some example embodiments, the electrical signal may be a carrier signal or a data encoded signals during time durations other than the first and second time durations.

At step 704, the method 704 includes receiving a second visible light by a receiver of the lighting device such as the lighting device 100, 200. For example, the second visible light may be the visible light 110 shown in FIGS. 1 and 2. At step 706, the method 700 includes checking for motion in a monitored area based on the second visible light and the carrier frequency. In some example embodiments, the method 700 may include determining the direction motion in response to or in conjunction with detecting the motion.

Figure 8:
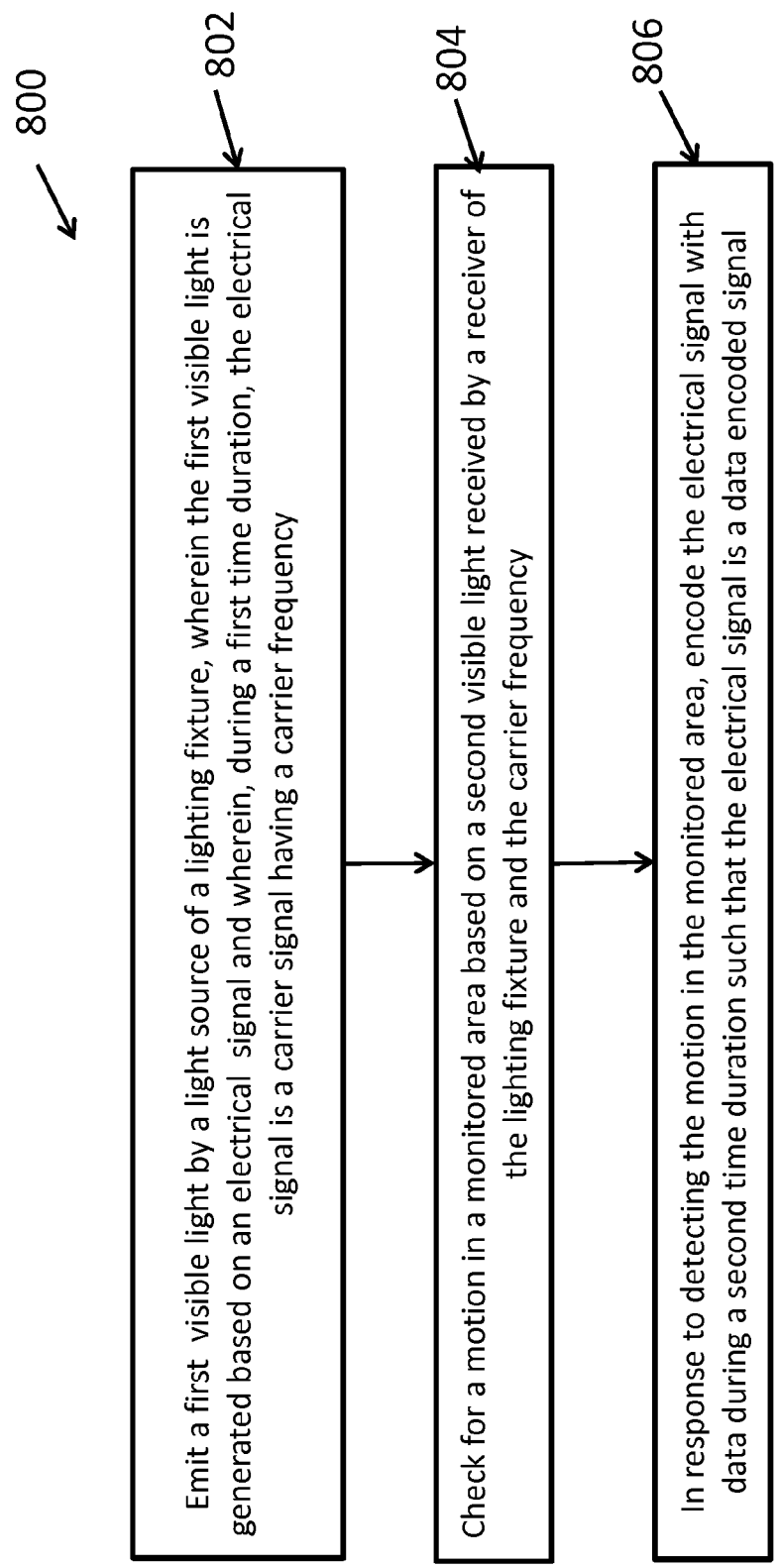
FIG. 8 is a flowchart illustrating a method of visible-light based communication and occupancy detection according to another example embodiment.

FIG. 8 is a flowchart illustrating a method 800 of visible-light based communication and occupancy detection according to another example embodiment. At step 802, the method 800 includes emitting a first visible light by a light source of a lighting device/fixture such as the lighting device 100, 200 of FIGS. 1 and 2, respectively. For example, the first visible light may be the visible light 114 shown in FIGS. 1 and 2. The first visible light is generated based on an electrical signal. For example, the electrical signal may be the output signal generated by the transmitter circuit 108 of FIG. 1 on the connection 124. As another example, the electrical signal may be the driver signal generated by the driver 106 of FIG. 2 on the connection 204. During a first duration, the electrical signal may be a carrier signal having a carrier frequency. In some example embodiments, the electrical signal may be a carrier signal during different time durations that are separated by other time durations where the electrical signal is not a carrier signal.

At step 804, the method 800 includes checking for motion in a monitored area based on a second visible light received by a receiver of the lighting device and the carrier frequency. For example, the second visible light may be the visible light 110 shown in FIGS. 1 and 2. As described above, at least a portion of the second visible light may include at least a portion of the first visible light reflected off a stationary or mobile object. In some example embodiments, the method 800 may include determining the direction motion in response to or in conjunction with detecting the motion.

The method 800 further includes at step 806, in response to detecting the motion in the monitored area, encoding the electrical signal with data during a second time duration such that the electrical signal is a data encoded signal. For example, the data encoded signal may be used to generate the first visible light during a particular time duration to communicate a message via the first visible light indicating detection of the motion to other devices capable of processing the visible light.

Figure 9:
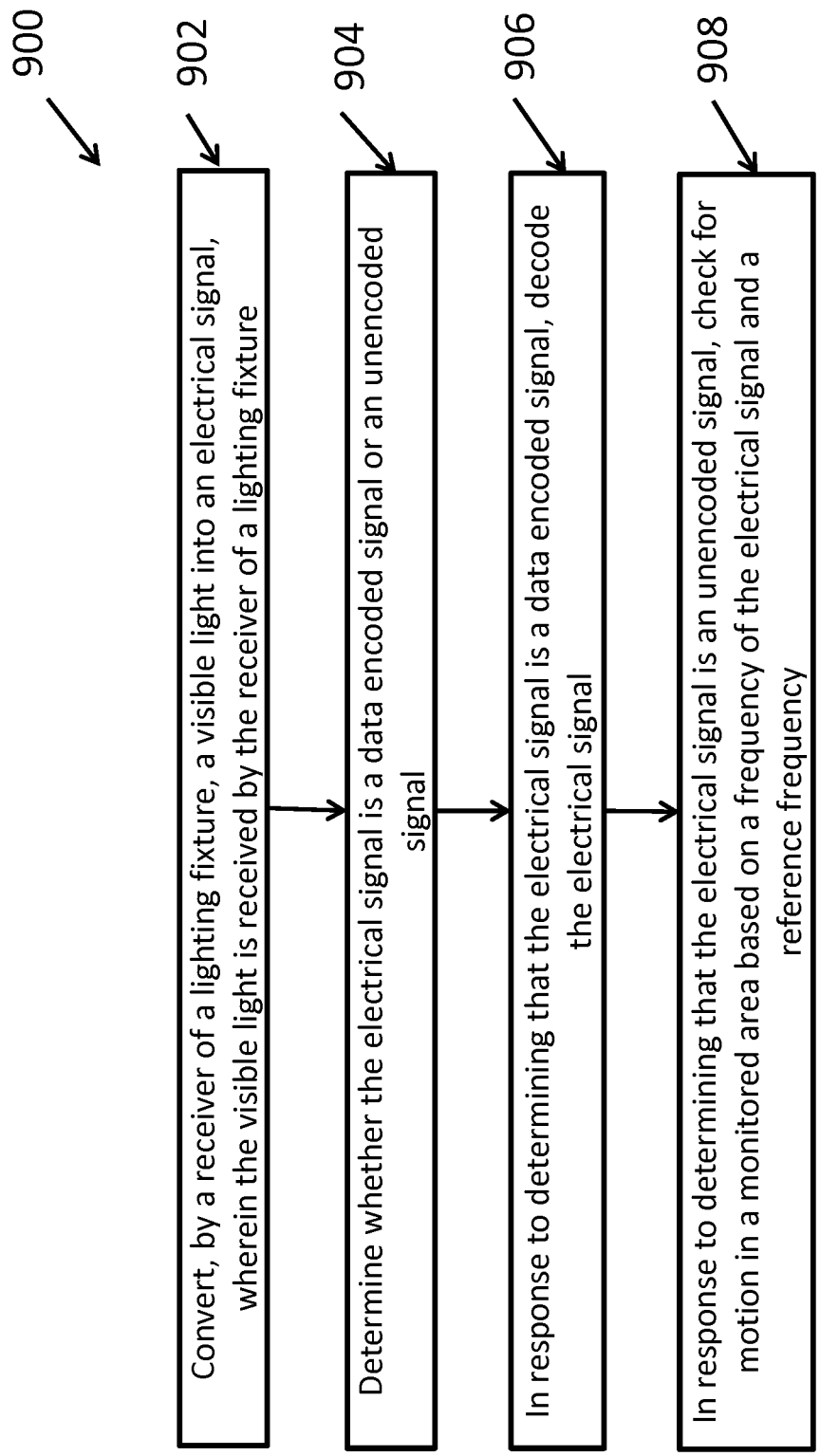
FIG. 9 is a flowchart illustrating a method of visible-light based communication and occupancy detection according to another example embodiment.

FIG. 9 is a flowchart illustrating a method 900 of visible-light based communication and occupancy detection according to another example embodiment. The method 900 includes converting a visible light by a receiver of a lighting device/fixture into an electrical signal, at step 902. The visible light may be received by the receiver of the lighting device such as the lighting device 100, 200 of FIGS. 1 and 2, respectively. For example, the receiver may be the light receiver 104 shown in FIGS. 1 and 2. At step 904, the method 900 includes determining whether the electrical signal is a data encoded signal or an unencoded signal (e.g., a carrier signal). The method 900 includes at step 906, in response to determining that the electrical signal is a data encoded signal, decoding the electrical signal. For example, the processor 102 of FIGS. 1 and 2 may decode the electrical signal. To illustrate, the processor 102 may determine that the decoded signal indicates that a motion is detected by another lighting device or a motion detector capable of communicating using visible light. At step 908, the method 900 includes, in response to determining that the electrical signal is an unencoded signal, checking for motion in a monitored area based on a frequency of the electrical signal and a reference frequency. To illustrate, the processor 102 of FIGS. 1 and 2 may detect motion within the monitored area by determining whether the frequency of the electrical signal is higher or lower than the reference frequency (or the carrier frequency) by more than a tolerance value. Further, the processor 102 may determine the direction of motion based on an upper threshold and a lower threshold in a manner described above.

In some example embodiments, the lighting devices 100, 200 operate to detect motion based on Doppler shift/effect principles.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. A lighting device for illumination, data communication, and occupancy detection, the lighting device comprising:
   a processor;
   a transmitter circuit configured to generate a first electrical signal;
   a light source configured to emit a first visible light based on the first electrical signal; and
   a receiver configured to receive a second visible light and to convert the second visible light into a second electrical signal, wherein the processor is configured to determine whether the second electrical signal is a carrier signal that is unencoded with data and wherein the processor is configured to detect a motion in a monitored area based on the second electrical signal in response to determining the second electrical signal is the carrier signal.

2. The lighting device of claim 1, wherein the processor is configured to determine a direction of the motion.

3. The lighting device of claim 2, wherein the lighting device is configured to increase an intensity level of the first visible light in response to the processor determining the motion is toward the lighting device.

4. The lighting device of claim 1, wherein the processor is configured to decode the second electrical signal in response to determining that the second electrical signal is a data encoded signal.

5. The lighting device of claim 1, wherein at least a portion of the second visible light is a portion of the first visible light that is reflected off a stationary object or a mobile object.

6. The lighting device of claim 1, wherein the first electrical signal is the carrier signal having a carrier frequency during a first time duration and wherein the first electrical signal is a data encoded signal during a second time duration.

7. The lighting device of claim 1, wherein the first electrical signal has a first frequency during a first time duration.

8. The lighting device of claim 7, wherein the processor is configured to detect the motion in the monitored area based on the first frequency of the first electrical signal and a frequency of the second electrical signal.

9. The lighting device of claim 1, wherein the processor is configured to detect the motion in the monitored area based on a reference frequency and a frequency of the second electrical signal.

* * * * *